(12) United States Patent
Twerdocleb et al.

(10) Patent No.: US 11,565,357 B2
(45) Date of Patent: Jan. 31, 2023

(54) PIPE SPINNER AND LIFTER

(71) Applicant: Precision Fiberglass Piping Inc., Red Deer (CA)

(72) Inventors: Colin Twerdocleb, Sylvan Lake (CA); Nathan Ristau, Bentley (CA)

(73) Assignee: Precision Fiberglass Piping Inc., Red Deer (CA)

( * ) Notice: Subject to any disclaimer, the term of this patent is extended or adjusted under 35 U.S.C. 154(b) by 491 days.

(21) Appl. No.: 16/503,350

(22) Filed: Jul. 3, 2019

(65) Prior Publication Data

US 2020/0009695 A1 Jan. 9, 2020

Related U.S. Application Data

(60) Provisional application No. 62/693,447, filed on Jul. 3, 2018.

(30) Foreign Application Priority Data

Jul. 3, 2018 (CA) ................................ CA 3010169

(51) Int. Cl.
   *B23P 19/06* (2006.01)

(52) U.S. Cl.
   CPC .................................. *B23P 19/061* (2013.01)

(58) Field of Classification Search
   CPC .. B66C 1/422; B66C 1/42; B66C 1/48; B66C 1/585; B66C 1/625; B66C 1/22; B66C 1/28; B65G 7/12; B23P 19/061; F16L 1/036
   See application file for complete search history.

(56) References Cited

U.S. PATENT DOCUMENTS

| | | | | | |
|---|---|---|---|---|---|
| 1,301,728 A | * | 4/1919 | Milne | ..................... | B66C 1/422 294/106 |
| 1,877,974 A | * | 9/1932 | Robb | ...................... | F16L 1/038 414/745.6 |
| 3,155,416 A | * | 11/1964 | Buchik | ................... | B66C 1/422 294/81.61 |
| 3,757,837 A | * | 9/1973 | French | ................. | A01G 23/095 144/24.13 |
| 4,446,761 A | * | 5/1984 | Boyadjieff | ............ | E21B 19/168 81/57.19 |
| 4,742,854 A | * | 5/1988 | Forslund | ................. | B27B 25/04 144/250.17 |
| 5,957,177 A | * | 9/1999 | Smith | ..................... | B27B 25/02 144/248.7 |

(Continued)

*Primary Examiner* — Christopher M Koehler
(74) *Attorney, Agent, or Firm* — Sander R. Gelsing (57) ABSTRACT

In one aspect there is provided a pipe spinner and lifter for supporting and rotating a cylindrical member having a longitudinal axis. The pipe spinner and lifter comprises a pair of jaws that pivot about a pivot member, to allow the pipe spinner and lifter to actuate between an open configuration and a closed configuration. A plurality of rollers are mounted on the jaws, each rotatable about a rolling axis. When the pipe spinner and lifter is in the closed configuration, the cylindrical member can be rotatably captured by the pipe spinner and lifter, allowing the cylindrical member to rotate about its longitudinal axis. Preferably, the plurality of rollers are arranged in a substantially mirrored arrangement on the jaws. More preferably, the rolling axis of each of the rollers is substantially parallel to the cylindrical member's longitudinal axis.

12 Claims, 7 Drawing Sheets

(56) References Cited

U.S. PATENT DOCUMENTS

| | | | |
|---|---|---|---|
| 6,280,119 B1* | 8/2001 | Ryan | B66C 1/425 |
| | | | 294/104 |
| 2005/0034565 A1* | 2/2005 | Drzewiecki | E21B 19/164 |
| | | | 81/57.17 |
| 2009/0314137 A1* | 12/2009 | Perez | E21B 19/168 |
| | | | 81/57.16 |
| 2014/0259597 A1* | 9/2014 | Lavalley | F16L 1/036 |
| | | | 29/407.1 |
| 2015/0275599 A1* | 10/2015 | Russo | E21B 19/168 |
| | | | 166/377 |
| 2016/0169413 A1* | 6/2016 | Camacho | F16L 1/036 |
| | | | 701/50 |
| 2017/0037689 A1* | 2/2017 | Perez | E21B 19/168 |
| 2017/0314350 A1* | 11/2017 | McClure | E21B 19/161 |
| 2018/0347294 A1* | 12/2018 | Vo | E21B 19/161 |
| 2018/0347296 A1* | 12/2018 | Vo | E21B 19/161 |

* cited by examiner

PIPE SPINNER AND LIFTER

CROSS REFERENCE TO RELATED APPLICATION

This application is a non-provisional application which claims priority to, and benefit of, U.S. Provisional Patent Application Ser. No. 62/693,447 filed Jul. 3, 2018 and entitled, "PIPE SPINNER AND LIFTER", the entirety of which is incorporated herein by reference.

FIELD OF THE INVENTION

The field of the present invention relates generally to providing a pipe spinner and, more particularly, to providing a pipe spinner and lifter for supporting and rotating pipe and other cylindrical members in a substantially horizontally oriented manner to facilitate both lifting and threading sections of pipe together.

BACKGROUND OF THE INVENTION

In the piping and pipeline industry there is often a need to move or manipulate sections of pipe, as well as to thread together (or unthread) sections of pipe; e.g. such as during installation of pipelines and piping systems.

Sections of pipe may be moved manually, by being gripped and lifted by one or more workers. Slings, chains and hydraulic lifting booms may also be used to lift pipe. A scissor action pipe lifter or pipe clamp is often employed to securely lift and move sections of pipe, wherein the section of pipe is securely gripped in a substantially horizontal manner (i.e. with the pipe's longitudinal axis being oriented substantially horizontal) until the pipe is laid down or released. Scissor action pipe clamps normally comprise pads or the like on their jaws which, when the clamp is actuated during a lift, apply a high static friction force against the pipe to keep it from slipping while being lifted. However, this also prevents the section of pipe from rotating about its longitudinal axis while it is engaged by a scissor-type pipe clamp.

In spinning or rotating a pipe about its longitudinal axis, to thread or unthread a pipe section, the practice heretofore has been to first position the pipe in place (e.g. on the ground, or on pipe stands with roller heads) and then to use a strap wrench or chain wrench to manually turn the pipe. Therefore, any pipe rotation (threading/unthreading) would be done after a section of pipe was positioned or lifted to the desired location, and after any scissor-type pipe clamp has disengaged from the section of pipe. However, this two-step process is very labour intensive, may create dangerous or worker safety issues, and often adds significantly to the costs associated with pipeline or piping installations.

An advantage therefore exists to reduce or eliminate the need for such manual labour and/or for a pipe clamp or lifter to also facilitate pipe rotation (about a pipe's longitudinal axis) while still being gripped or engaged by such a pipe clamp.

SUMMARY OF THE INVENTION

The present invention is directed to overcoming the prior art deficiencies in pipe lifters and pipe clamps which do not allow for easy rotation of a pipe while it is being lifted.

In one aspect there is provided a pipe spinner and lifter for supporting and rotating a cylindrical member having a longitudinal axis. The pipe spinner and lifter comprises a pair of jaws that pivot about a pivot member, to allow the pipe spinner and lifter to actuate between an open configuration and a closed configuration. A plurality of rollers are mounted on the jaws, each rotatable about a rolling axis. When the pipe spinner and lifter is in the closed configuration, the cylindrical member can be rotatably captured by the pipe spinner and lifter, allowing the cylindrical member to rotate about its longitudinal axis. Preferably, the plurality of rollers are arranged in a substantially mirrored arrangement on the jaws. More preferably, the rolling axis of each of the rollers is substantially parallel to the cylindrical member's longitudinal axis.

In another aspect, the pipe spinner and lifter further comprise at least one guide member to create a tensile member guide path within the pipe spinner and lifter. During operations, when a tensile member is first wrapped around the cylindrical member and is then directed substantially towards the pivot member, the guide member directs the tensile member to a first side of the pipe spinner and lifter.

In yet a further aspect, the pipe spinner and lifter furthers comprises a source of pull at the first side and a counter-weight at a second side of the pipe spinner and lifter. Then, during operations when the tensile member is operationally connected to the source of pull, the tensile member will cause the cylindrical member to rotate about its longitudinal axis, when the source of pull is actuated.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF THE PREFERRED EMBODIMENTS

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Figure 1:
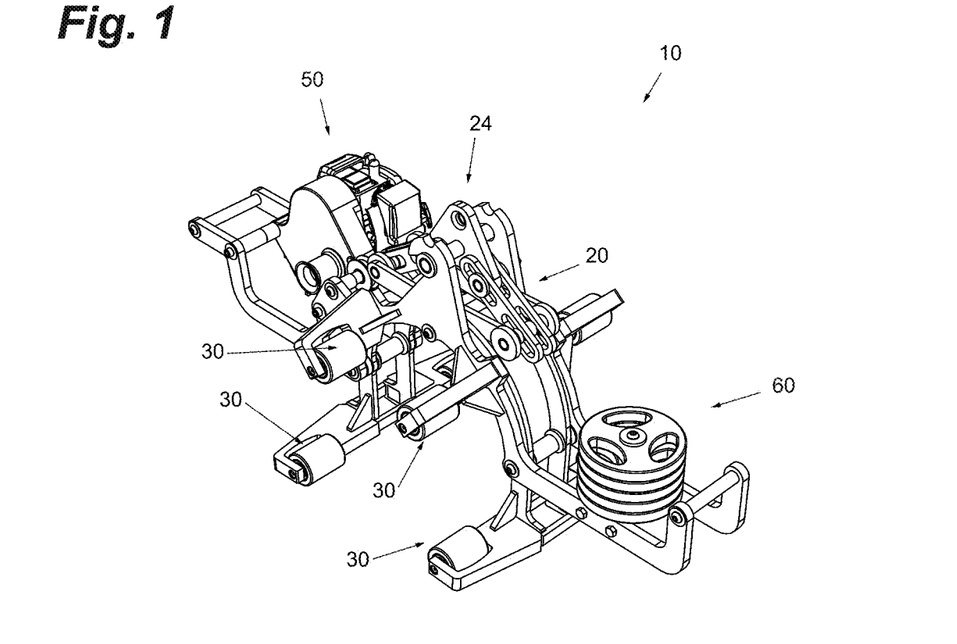
FIG. 1 is a front perspective view of one embodiment of the pipe spinner and lifter according to the present invention.
Figure 2:
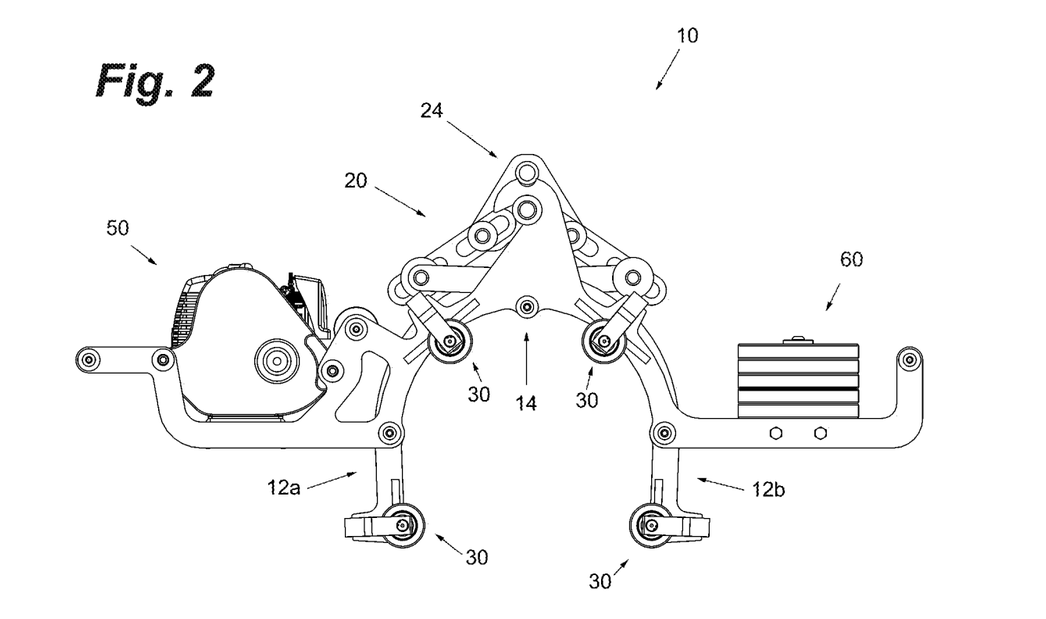
FIG. 2 is a front view of the pipe spinner and lifter of the embodiment of FIG. 1.
Figure 3:
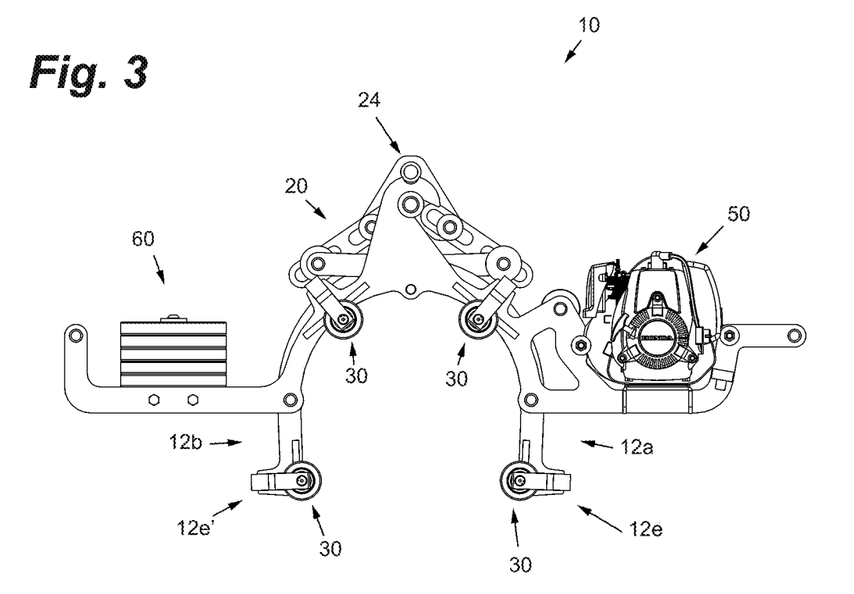
FIG. 3 is a rear view of the pipe spinner and lifter of the embodiment of FIG. 1.
Figure 4:
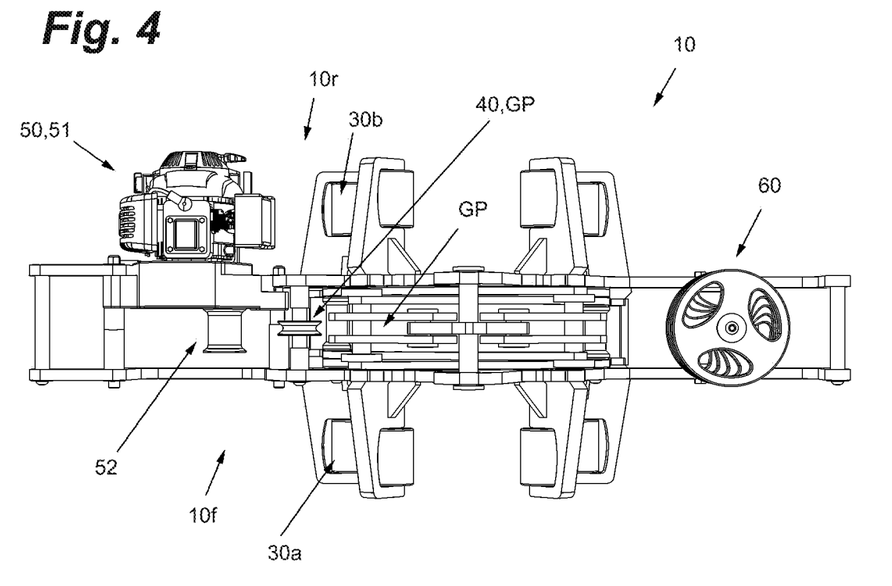
FIG. 4 is a top view of the pipe spinner and lifter of the embodiment of FIG. 1.
Figure 5:
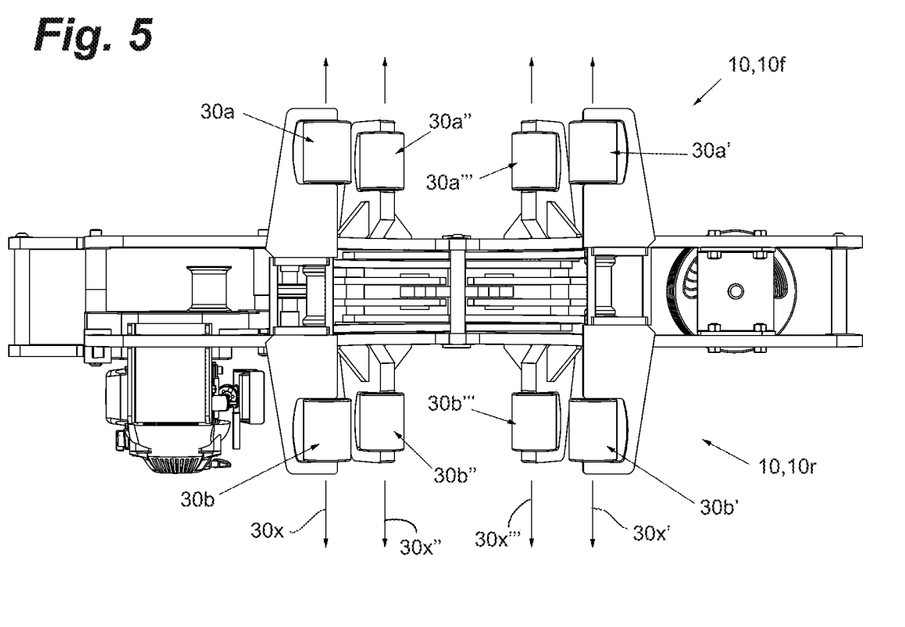
FIG. 5 is a bottom view of the pipe spinner and lifter of the embodiment of FIG. 1.
Figure 6:
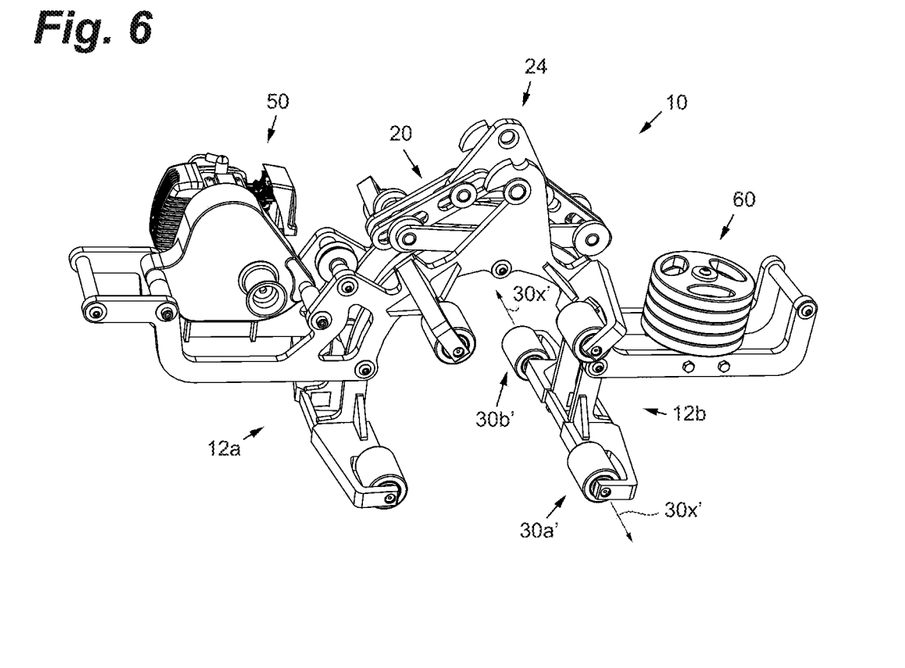
FIG. 6 is another front perspective view of the pipe spinner and lifter of the embodiment of FIG. 1.
Figure 7:
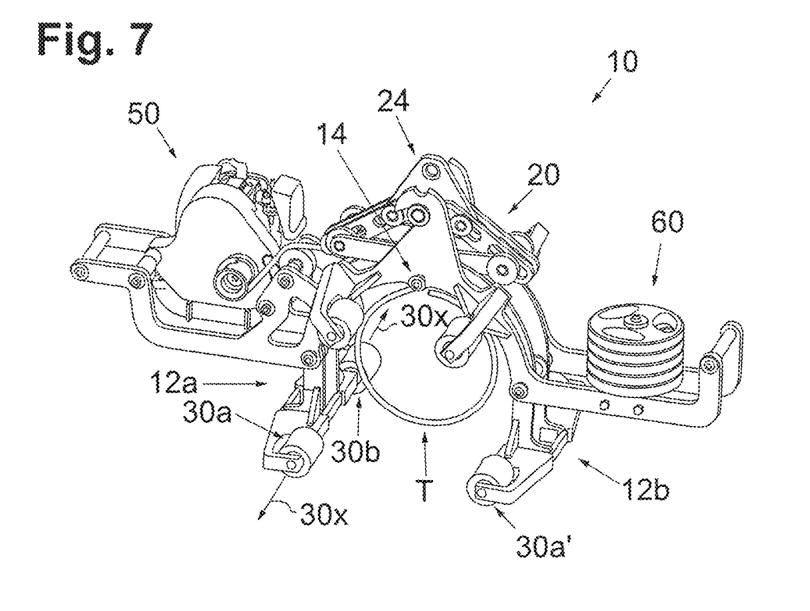
FIG. 7 is another front perspective view of the pipe spinner and lifter of the embodiment of FIG. 1, showing a tensile member wound therethrough.
Figure 8:
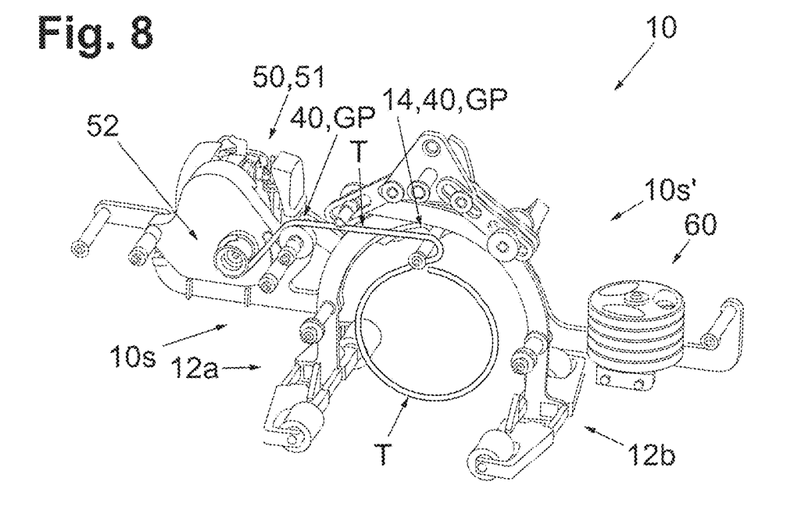
FIG. 8 is a front perspective view of the pipe spinner and lifter of the embodiment of FIG. 1, with some components hidden, so as to more clearly show the tensile member wound therethrough.
Figure 9:
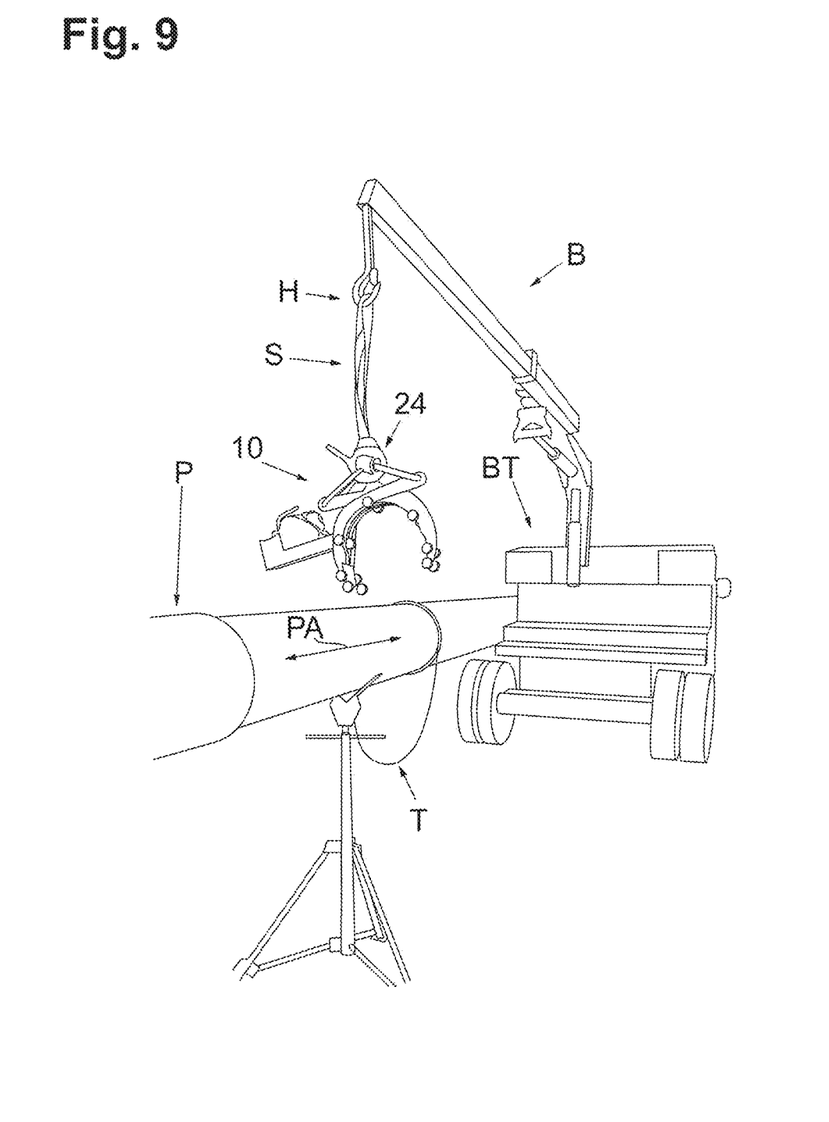
FIG. 9 is a perspective view of another embodiment of a pipe spinner and lifter according to the present invention, shown in the open configuration about to be positioned over a pipe.
Figure 10:
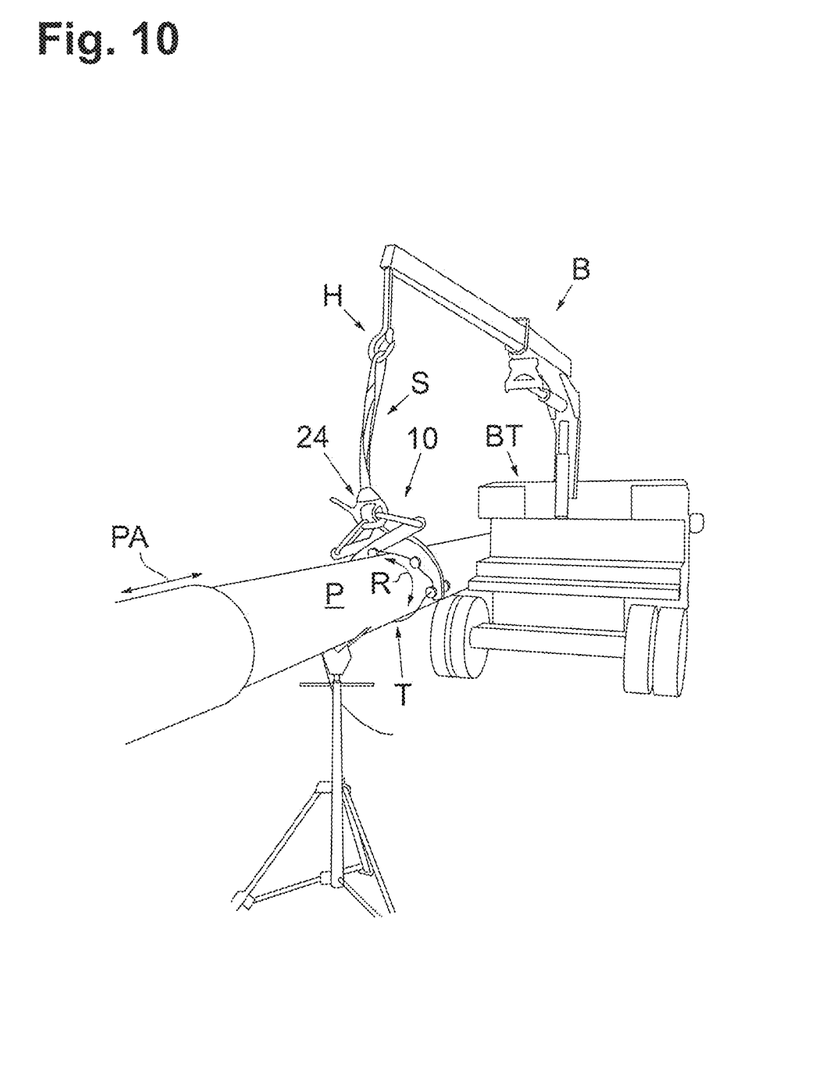
FIG. 10 is a perspective view of the pipe spinner and lifter of the embodiment of FIG. 9, shown positioned on a pipe.
Figure 11:
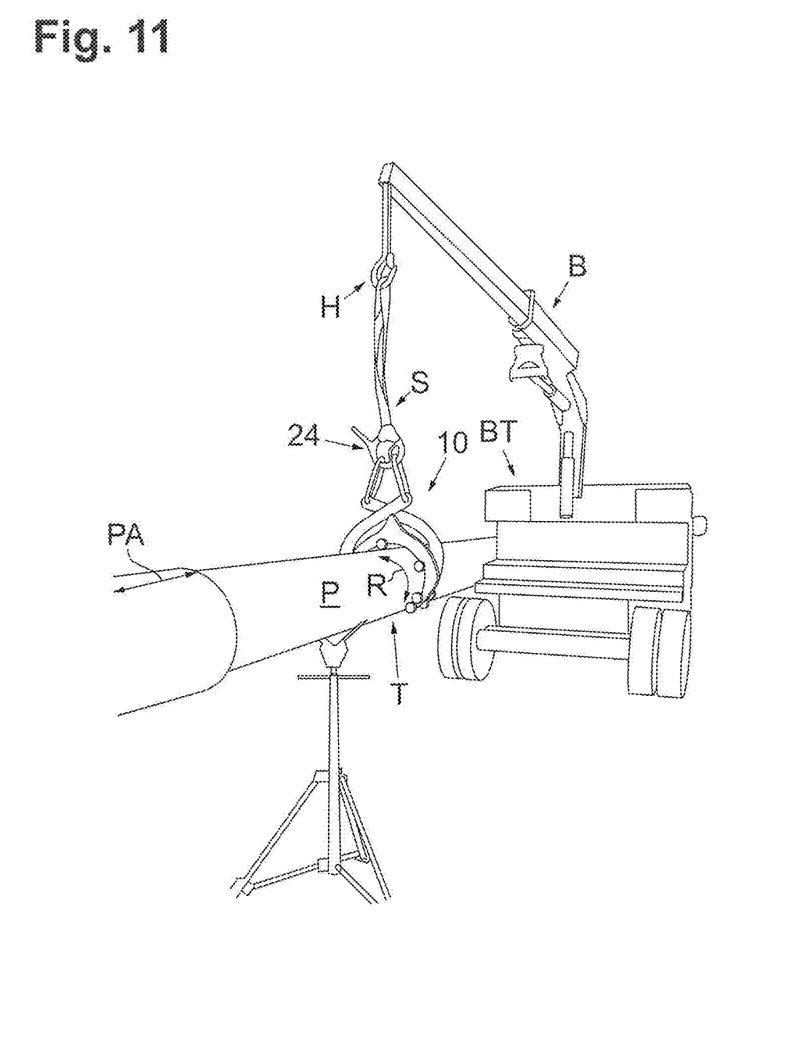
FIG. 11 is a perspective view of the pipe spinner and lifter of the embodiment of FIG. 9, shown positioned on a pipe in the close configuration.

FIGS. 1-11 show various embodiments of the invention for supporting and rotating pipe and other cylindrical members while in a substantially horizontally orientation. FIGS. 1-8 show a preferred embodiment the pipe spinner and lifter 10. FIGS. 9-11 show another embodiment of the pipe spinner and lifter 10, similar to the embodiment of FIGS. 1-8, but without a counterweight.

Referring generally to the embodiments in FIGS. 1-11, a pipe spinner and lifter 10 preferably comprises a pair of jaws 12a, 12b that each pivot about a pivot point or pivot member 14, so as to configure the pipe spinner and lifter 10 between an open or a closed configuration. Pivot member 14 may be a bushing, bearing, pin or other suitable member to allow jaws 12a, 12b to pivot thereabout. When in the open configuration, the pipe spinner and lifter 10 can be positioned around a pipe P or other tubular member (e.g. see FIG. 9). When in the closed configuration, the pipe spinner and lifter 10 will securely clamp onto a pipe P (e.g. see FIG. 11).

A conventional scissor linkage 20 is provided between the pair of jaws 12a, 12b and a lifting point or lifting member 24. Lifting member 24 may be a lifting lug having an opening 24o to receive a hook H, strap S or the like from a crane or boom B mounted on a boom truck BT, so as to move and suspend the pipe spinner and lifter 10 above a pipe P in a conventional manner (e.g. FIG. 9). Lifting member 24 is operationally connected to the pair of jaws 12a, 12b, via scissor linkage 20 in a conventional manner, so as to cause the pair of jaws 12a, 12b to actuate or move into the open configuration when the lifting member 24 is moved closer to the pivot member 14 (e.g. when released from boom truck BT), and to cause the pair of jaws 12a, 12b to actuate or move into the closed configuration when the lifting member 24 is moved away from the pivot member 14 (e.g. when being lifted by boom truck BT); all in a similar manner as how a conventional scissor-type pipe clamp is actuated.

A plurality of rollers 30 are provided or mounted to the pair of jaws 12a, 12b, with preferably at least one roller 30 on each of said jaw 12a and 12b. More preferably, a plurality of rollers 30 are provided to each of said jaw 12a and 12b in a pair-wise fashion, with one of each of said paired rollers (e.g. 30a, 30a') positioned substantially at the front end 10f of the pipe spinner and lifter 10, and the other of said paired rollers (e.g. 30b, 30b') positioned substantially at the rear end 10r of the pipe spinner and lifter 10, with each of said paired rollers (e.g. 30a, 30b) rotating about a shared rolling axis (e.g. 30x). For example roller 30a may be provided on jaw 12a at the front end 10f, and roller 30b may be provided on jaw 12a at the rear end 10r, both rollers 30a, 30b rotating about shared axis 30x.

Preferably, a plurality of paired rollers (e.g. 30a/30b, 30a'/30b', 30a"/30b", and 30a'''/30b''') are provided on the pair of jaws 12a, 12b in a substantially mirrored arrangement (with the arrangement of rollers 30 on jaw 12b being a substantially mirror image of the arrangement of rollers on jaw 12a), each pair rotating about its own rolling axis (e.g. 30x, 30x', 30x", and 30x'''); e.g. as shown in FIGS. 1-8. More preferably, each of the paired rollers' rolling axis (e.g. 30x, 30x', 30x", and 30x''') will be substantially parallel to a pipe's longitudinal axis PA, when a pipe is held by the pipe spinner and lifter 10 in the closed configuration. Even more preferably, at least one pair of rollers is provided at substantially the tips or ends 12e, 12e' of each of the jaws 12a, 12b, so as to more easily enable the pipe spinner and lifter 10 to securably and rotatably capture a pipe P or other tubular member when in the closed configuration (e.g. rollers 30a/30b and 30a'/30b' in FIGS. 1-8). Still even more preferably, the pipe spinner and lifter 10 will only engage or contact the pipe P via rollers 30, thereby ensuring that the pipe P is rotatably captured when in the closed configuration.

Rollers 30 are of suitable dimensions and configuration to allow any pipe P or other tubular member that may be held by the pipe spinner and lifter 10, when in the closed configuration, to substantially, freely rotate R about the pipe's longitudinal axis PA (e.g. see FIG. 10) with minimal force or torque being applied to the pipe P. As will now be apparent to those skilled in the art, the pipe spinner and lifter 10, by virtue of the plurality of rollers 30 on the jaws 12a, 12b can rotatably, securably hold a pipe P or other tubular member (when in the closed configuration) so as to allow the pipe P to rotate about its longitudinal axis PA while still being securely held and/or lifted thereby. Advantageously, a pipe P or other tubular member may be lifted with the pipe spinner and lifter 10 (in a substantially similar manner that conventional scissor-type pipe clamps would lift a pipe) and, unlike prior-art pipe lifters, the pipe P can also be rotated about its longitudinal axis while lifted; thereby making any threading/unthreading of a section of pipe significantly easier and safer.

In a preferred embodiment, the pipe spinner and lifter 10 further comprises one or more pulleys, pins or guide members 40 to direct any tensile member T (such as a rope or chain that may first be wrapped around a pipe P and then directed substantially towards the pivot member 14) substantially to one side 10s of the pipe spinner and lifter 10 (e.g. see FIG. 8). As such, said one or more pulleys, pins or guide members 40 thereby create a tensile member guide path GP within the pipe spinner and lifter 10. Preferably, a source of pull or pulling actuator 50 is provided on the pipe spinner and lifter 10 at said side 10s to where the tensile member T is directed (e.g. see FIG. 8). The source of pull or pulling actuator 50 may be a winch 51 mounted on side 10s and having a winch drum 52 to receive the tensile member T therearound. More preferably, and to assist in maintaining the pipe spinner and lifter 10 in a desired orientation when suspended above a pipe P by lifting member 24, a counterweight 60 is provided at an opposite side 10s' to the side 10s where the winch 51 is mounted.

Advantageously, during operations when the pipe spinner and lifter 10 is in the closed configuration and has securably and rotatably captured a pipe P, a tensile member T may be first wrapped around the pipe P (e.g. FIG. 9), through the pipe spinner and lifter 10 towards the pivot 14, and then towards the source of pull 50. Advantageously, when tensile member T is operationally connected to the source of pull 50 (e.g. by being wrapped around drum 52), and when a pulling force is imparted from said source of pull 50, the tensile member T will cause the pipe P to rotate R about its longitudinal axis PA and be further directed towards the pivot 14 within the jaws 12a, 12b; thereby further facilitating the secured capturing of pipe P by lifter 10 while in the closed configuration.

Preferably, tensile member T is sufficiently long so that it will not pull entirely off of pipe P, and/or through the pipe spinner and lifter 10, while a pulling force is being applied to it during rotation operations. Advantageously, tensile member T and source of pull 50 act to rotate pipe P about its longitudinal axis PA, thereby obviating the need to manually rotate pipe P (e.g. with a strap wrench) to thread or unthread it. Those skilled in the art will now appreciate that tensile member T may be wrapped around the pipe P in either a clockwise or counter-clockwise manner (relative to its longitudinal axis PA), thereby causing pipe P to rotated in either a clockwise or counter-clockwise manner when a pulling force is imparted from the source of pull 50 the tensile member T wrapped around pipe P. Moreover, those skilled in the art will now also appreciate that the side 10s of the pipe spinner and lifter 10 having the source of pull 50 may also be positioned on either side of the pipe's longitudinal axis PA, thereby providing another way to adjust the direction that pipe P may be rotated R about its longitudinal axis PA.

Therefore, it will now be appreciated by those skilled in the art that by varying the positioning of the source of pull 50 (on one side or the other of pipe's longitudinal axis PA) and/or by varying how tensile member T may be wrapped around pipe P (clockwise or counterclockwise), a desired pipe rotation R about its longitudinal axis PA may be achieved when a pulling force is imparted from the source of pull 50 the tensile member T wrapped around pipe P.

Preferably, the tensile member guide path GP is located substantially midway between the front and rear ends 10f, 10r. More preferably, the tensile member guide path GP is located substantially midway between each of the paired rollers 30 (e.g. substantially midway between rollers 30a/30b; see FIG. 4). Advantageously, any force applied to the tensile member T by the source of pull 50 will be substantially evenly distributed to all of the rollers 30, rather than to the rollers on either one of the front end 10f or the rear end 10r.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A pipe spinner and lifter for supporting and rotating a cylindrical member having a longitudinal axis, the pipe spinner and lifter comprising:
   a pair of jaws that pivot about a pivot member to allow the pipe spinner and lifter to actuate between an open configuration and a closed configuration; and
   a plurality of rollers mounted on said pair of jaws, each of said plurality of rollers rotating about a respective rolling axis;
   wherein the cylindrical member may be rotatably captured by the pipe spinner and lifter, to allow said cylindrical member to rotate about said longitudinal axis in a substantially horizontal orientation, when the pipe spinner and lifter is in the closed configuration.

2. The pipe spinner and lifter of claim 1 wherein the plurality of rollers are arranged in a substantially mirrored arrangement on said pair of jaws.

3. The pipe spinner and lifter of claim 1 wherein the respective rolling axis of each of said plurality of rollers is substantially parallel to the cylindrical member's longitudinal axis when said cylindrical member is rotatably captured by the pipe spinner and lifter.

4. The pipe spinner and lifter of claim 1 wherein the pair of jaws each have an end; and
   wherein at least one pair of the plurality of rollers is mounted substantially on the ends of said pair of jaws.

5. The pipe spinner and lifter of claim 1 further comprising at least one guide member to create a tensile member guide path within the pipe spinner and lifter.

6. The pipe spinner and lifter of claim 5 wherein, when a tensile member is first wrapped around the cylindrical member and is then directed substantially towards the pivot member, said at least one guide member subsequently directs said tensile member to a first side of the pipe spinner and lifter; and
   wherein said tensile member does not engage said plurality of rollers.

7. The pipe spinner and lifter of claim 6 further comprising a source of pull at said first side of the pipe spinner and lifter.

8. The pipe spinner and lifter of claim 7 further comprising a counterweight at a second side of the pipe spinner and lifter, said second side being substantially opposite to said first side.

9. The pipe spinner and lifter of claim 8 wherein, when said tensile member is operationally connected to the source of pull, said tensile member will cause the cylindrical member to rotate about its longitudinal axis when the source of pull is actuated.

10. A pipe spinner and lifter for supporting and rotating a cylindrical member having a longitudinal axis, the pipe spinner and lifter comprising:
    a pair of jaws that pivot about a pivot member to allow the pipe spinner and lifter to actuate between an open configuration and a closed configuration; and
    a plurality of rollers mounted on said pair of jaws, each of said plurality of rollers rotating about a respective rolling axis;
    wherein the cylindrical member may be rotatably captured by the pipe spinner and lifter, to allow said cylindrical member to rotate about said longitudinal axis in a substantially horizontal orientation, when the pipe spinner and lifter is in the closed configuration;
    wherein the plurality of rollers are arranged in a substantially mirrored arrangement on said pair of jaws; and
    wherein the respective rolling axis of each of said plurality of rollers is substantially parallel to the cylindrical member's longitudinal axis when said cylindrical member is rotatably captured by the pipe spinner and lifter.

11. The pipe spinner and lifter of claim 10 further comprising at least one guide member to create a tensile member guide path within the pipe spinner and lifter;
    wherein, when a tensile member is first wrapped around the cylindrical member and is then directed substantially towards the pivot member, said at least one guide member subsequently directs said tensile member to a first side of the pipe spinner and lifter; and
    wherein said tensile member does not engage said plurality of rollers.

12. The pipe spinner and lifter of claim 11 further comprising:
    a source of pull at said first side of the pipe spinner and lifter; and
    a counterweight at a second side of the pipe spinner and lifter, said second side being substantially opposite to said first side;
    wherein, when said tensile member is operationally connected to the source of pull, said tensile member will cause the cylindrical member to rotate about its longitudinal axis when the source of pull is actuated.

* * * * *